United States Patent
Vlietinck et al.

(10) Patent No.: US 10,013,652 B2
(45) Date of Patent: Jul. 3, 2018

(54) FAST DEEP NEURAL NETWORK FEATURE TRANSFORMATION VIA OPTIMIZED MEMORY BANDWIDTH UTILIZATION

(71) Applicant: Nuance Communications, Inc., Burlington, MA (US)

(72) Inventors: Jan Vlietinck, Merelbeke (BE); Stephan Kanthak, Aachen (DE); Rudi Vuerinckx, Sint-Lambrechts-Woluwe (BE); Christophe Ris, Taintignies (BE)

(73) Assignee: Nuance Communications, Inc., Burlington, MA (US)

(*) Notice: Subject to any disclaimer, the term of this patent is extended or adjusted under 35 U.S.C. 154(b) by 182 days.

(21) Appl. No.: 14/699,778

(22) Filed: Apr. 29, 2015

(65) Prior Publication Data
US 2016/0322042 A1   Nov. 3, 2016

(51) Int. Cl.
| | |
|---|---|
| *G10L 15/00* | (2013.01) |
| *G06N 3/08* | (2006.01) |
| *G06N 3/04* | (2006.01) |
| *G10L 15/16* | (2006.01) |
| *G10L 15/06* | (2013.01) |
| *G10L 15/02* | (2006.01) |

(52) U.S. Cl.
CPC ............ *G06N 3/08* (2013.01); *G06N 3/0454* (2013.01); *G10L 15/16* (2013.01); *G10L 15/02* (2013.01); *G10L 2015/0635* (2013.01)

(58) Field of Classification Search
None
See application file for complete search history.

(56) References Cited

U.S. PATENT DOCUMENTS

| | | | | |
|---|---|---|---|---|
| 5,872,988 A | * | 2/1999 | Duranton | G06F 15/8015 712/22 |
| 2012/0166363 A1 | * | 6/2012 | He | G06N 3/0409 706/2 |

(Continued)

OTHER PUBLICATIONS

Hinton, G., et al., "Deep Neural Networks for Acoustic Modeling in Speech Recognition,", The shared views of four research groups. IEEE Signal Processing Magazine 29:(6), 82-97 (Apr. 27, 2012).

*Primary Examiner* — Kevin Ky
(74) *Attorney, Agent, or Firm* — Hamilton, Brook, Smith & Reynolds, P.C.

(57) ABSTRACT

Deep Neural Networks (DNNs) with many hidden layers and many units per layer are very flexible models with a very large number of parameters. As such, DNNs are challenging to optimize. To achieve real-time computation, embodiments disclosed herein enable fast DNN feature transformation via optimized memory bandwidth utilization. To optimize memory bandwidth utilization, a rate of accessing memory may be reduced based on a batch setting. A memory, corresponding to a selected given output neuron of a current layer of the DNN, may be updated with an incremental output value computed for the selected given output neuron as a function of input values of a selected few non-zero input neurons of a previous layer of the DNN in combination with weights between the selected few non-zero input neurons and the selected given output neuron, wherein a number of the selected few corresponds to the batch setting.

24 Claims, 10 Drawing Sheets

(56) References Cited

U.S. PATENT DOCUMENTS

| | | | |
|---|---|---|---|
| 2015/0161987 A1* | 6/2015 | Horesh | G10L 15/16 704/232 |
| 2016/0196488 A1* | 7/2016 | Ahn | G06N 3/049 706/41 |
| 2016/0217367 A1* | 7/2016 | Moreno | G06N 3/08 |
| 2016/0247064 A1* | 8/2016 | Yoo | G06N 3/082 |

* cited by examiner

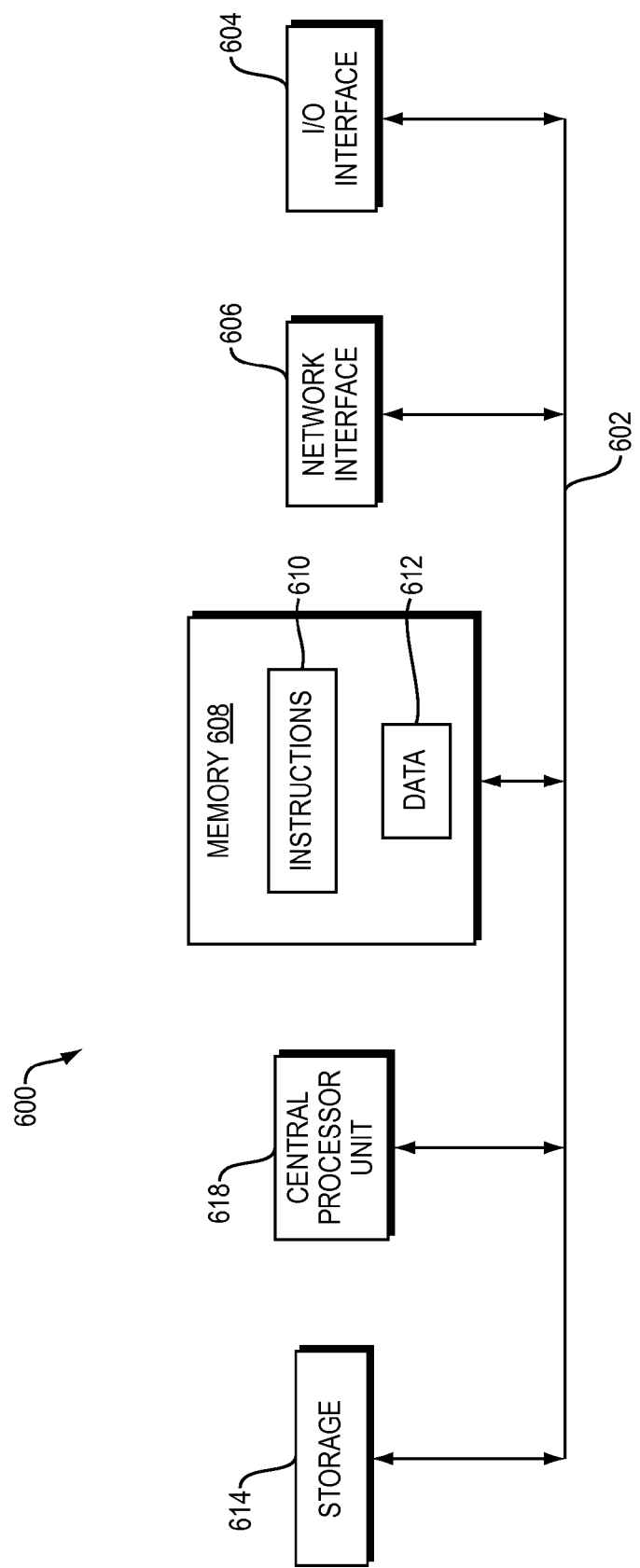

FAST DEEP NEURAL NETWORK FEATURE TRANSFORMATION VIA OPTIMIZED MEMORY BANDWIDTH UTILIZATION

BACKGROUND

A speech recognition system analyzes a user's speech to determine what the user said. Most speech recognition systems are frame-based. In a frame-based system, input speech is processed into a sequence of digital speech feature frames. Each speech feature frame can be thought of as a multi-dimensional vector that represents various characteristics of the speech signal present during a short time window of the input speech.

The speech recognition system compares the input speech frames to find statistical models that best match the speech feature characteristics and then determines a corresponding representative text or semantic meaning associated with the statistical models. Modern statistical models are state sequence models, such as Hidden Markov Models (HMMs), that model speech sounds (usually phonemes) using mixtures of Gaussian distributions.

Many speech recognition systems use discriminative training techniques that are speech recognition techniques that dispense with a purely statistical approach to HMM parameter estimation and instead optimize some classification-related measure of training data. Examples of such discriminative training techniques are Deep Neural Network (DNNs).

A DNN is a feed-forward, artificial network that has more than one layer of hidden units between its inputs and its outputs. DNNs with many hidden layers and many units per layer are very flexible models with a very large number of parameters. This makes them capable of modeling very complex and highly non-linear relationships between inputs and outputs, which is important for high-quality acoustic modeling.

SUMMARY

According to one example embodiment, a method for improving computation time of speech recognition processing in an electronic device may comprise, by a processor, updating a memory, corresponding to a selected given output neuron of a current layer of a Deep Neural Network (DNN), with an incremental output value. The incremental output value may be computed for the selected given output neuron as a function of input values of a selected few non-zero input neurons of a previous layer of the DNN in combination with weights between the selected few non-zero input neurons and the selected given output neuron, wherein a number of the selected few corresponds to a batch setting. The method may further comprise iterating the updating for each output neuron of the current layer, and repeating the updating and the iterating for each next selected few non-zero input neurons of the previous layer to reduce a rate of accessing the memory based on the batch setting to improve the computation time of the speech recognition processing.

The batch setting may be a value of at least two.

The method may further comprise selecting the few non-zero input neurons from a plurality of input neurons of the previous layer of the DNN, wherein the few non-zero input neurons have non-zero input values and "skip-neurons" of the plurality of input neurons are skipped. The skip-neurons may have null input values. The method may further comprise selecting the given output neuron, fetching the weights between the selected few non-zero input neurons and the given output neuron, and computing the incremental output value.

The computing may further include employing Single Instruction Multiple Data (SIMD) instructions.

The method may further comprise selecting the few non-zero input neurons and terminating the repeating, iterating, and updating in an event each non-zero input neuron has been selected.

The method may further comprise selecting the few non-zero input neurons, and, in an event a remaining number of un-selected non-zero input neurons is fewer than the batch setting, the number of the selected few may correspond to the remaining number.

The method may further comprise receiving at least one speech signal over a speech interface, producing at least one feature vector from the at least one speech signal received, and applying the DNN to the at least one feature vector to compute at least one output feature vector for producing at least one speech recognition result.

The method may further comprise fetching the weights from a plurality of weight data structures stored in at least one memory of the speech recognition system and wherein a portion of the plurality of the weight data structures may be stored in different memories of the at least one memory.

The method may further comprise compressing a first portion of the weights and maintaining a second portion of the weights un-compressed, the second portion having weight values exceeding a range of the first portion, the second portion stored separately from the first portion. In an event all output values of all output neurons of the current layer have been computed based on all non-zero input values of all non-zero input neurons of the previous layer in combination with all compressed weights, the method may further include performing a subsequent pass to update each output value of each output neuron of the current layer based on input values of input neurons in combination with un-compressed weights.

The second portion may be stored in a sparse matrix.

Another example embodiment disclosed herein includes an apparatus corresponding to operations consistent with the method embodiments described above.

Further, yet another example embodiment includes a non-transitory computer-readable medium having stored thereon a sequence of instructions which, when loaded and executed by a processor, causes the processor to complete methods disclosed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 6 is a block diagram of an example of an embodiment of an internal structure of a computer in which various embodiments disclosed herein may be implemented.

DETAILED DESCRIPTION

A description of example embodiments of the invention follows.

Although Deep Neural Networks (DNNs) with many hidden layers and many units per layer are very flexible models with a very large number of parameters, DNNs are challenging to optimize. In a speech recognition system, applying a large DNN to feature vectors (e.g., fingerprints of each incoming frame of audio) every time frame, such as every 10 ms, 12.5 ms, 20 ms, or any other suitable time frame, can be challenging on platforms with limited available resources. In order to achieve real-time computation, embodiments disclosed herein enable fast DNN feature transformation via optimized memory bandwidth utilization. Embodiments disclosed herein may be applied to an application, such as speech recognition, or any suitable application employing a DNN.

Figure 1:
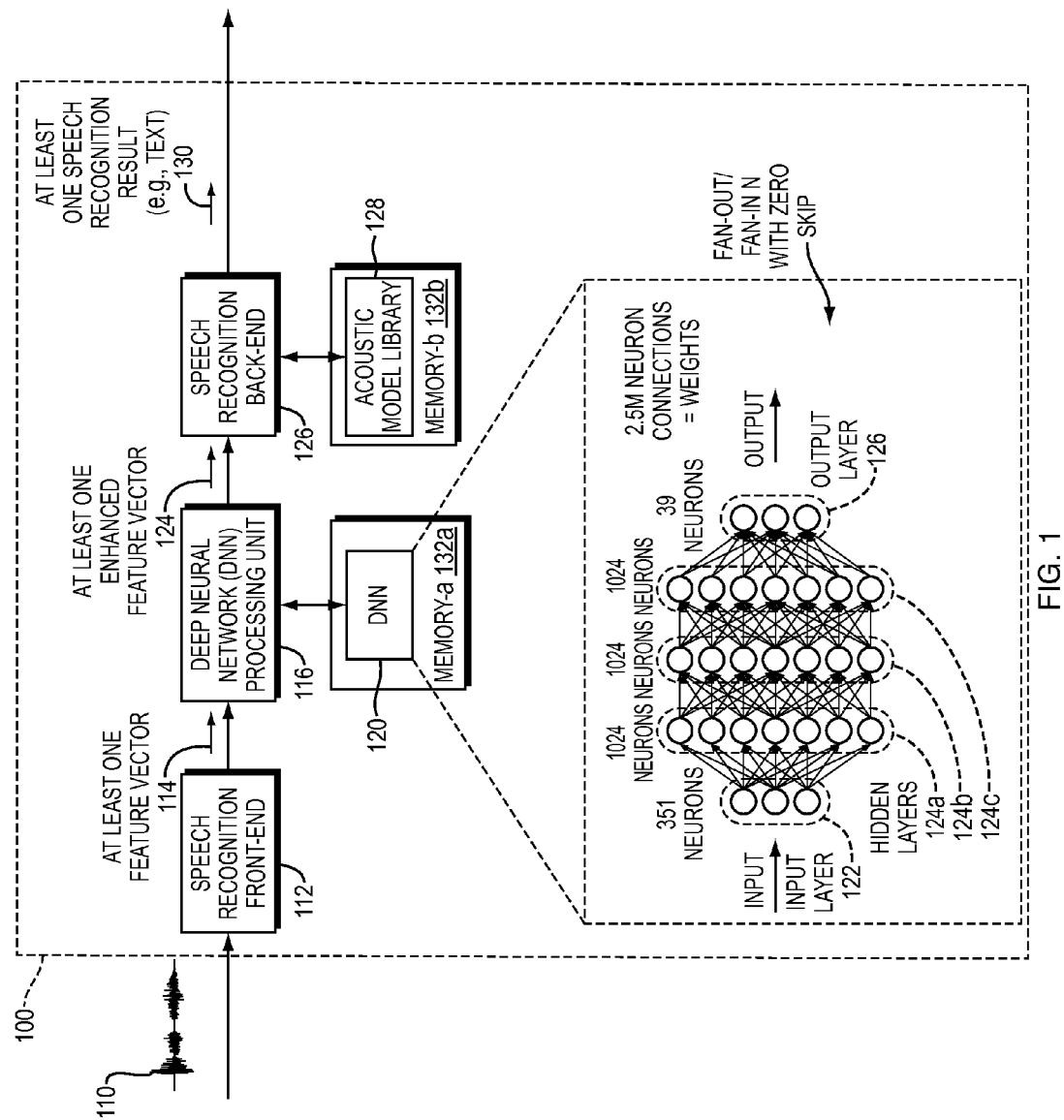
FIG. 1 is a block diagram of an example embodiment of the present invention as applied to a speech recognition system.

FIG. 1 is a block diagram of an example embodiment of the present invention as applied to a speech recognition system 100. At least one speech signal 110 is provided by a user (not shown) to the speech recognition system 100. The at least one speech signal 110, a sample of the user's voice, may be one or more utterances spoken by the user. The speech signal may be received via a hardware speech interface (not shown) of the speech recognition system 100.

According to at least one example embodiment, the speech recognition system 100 may include a speech recognition front-end 112, a Deep Neural Network (DNN) Processing Unit 116, and a speech recognition back-end 126. The speech recognition front-end 112 may be configured to produce at least one feature vector 114 from the at least one speech signal 110. The at least one feature vector 114 may be used by the DNN Processing Unit 116 to produce at least one enhanced feature vector 124.

To produce the at least one enhanced feature vector 124, the DNN Processing Unit 116 may compute a DNN 120 with a DNN topology 118 that includes an input layer 122 of neurons, an output layer 126 of neurons, and multiple hidden layers 124a-c of neurons therebetween. Lines with arrows illustrating connections between neurons of the DNN topology 118 may be referred to interchangeably herein as links or weights. It should be understood that the DNN 120 may have the DNN topology 118 or any other suitable DNN topology. Further, it should be understood that numbers for neurons and weights are for illustrative purposes and may or may not reflect numbers of the DNN 120. The DNN 120 may be stored in a first memory-a 132a. Values of neurons of the input layer 122 may be values of the at least one feature vector 114 that is applied to the DNN 122 to produce the at least one enhanced feature vector 124.

The at least one enhanced feature vector 124 may be used in conjunction with an acoustic model language vocabulary of an acoustic model library 128 by the speech recognition back-end 126 to produce at least one recognized speech result 130. The at least one recognized speech result 130 may be text, or any other suitable recognized speech result. The acoustic model library 128 may be stored in a second memory-b 132b that may be a storage device that is separate from or the same as the first memory 132a.

Embodiments disclosed herein enable computation time of the neural network layers (also referred to interchangeably herein as neural network stages) to be reduced. As each successive layer of the DNN 120 is computed, the output values of the successive layer are stored in memory. The manner in which the memory is updated to store the output values may effectuate computation time of the DNN 120, thus, impacting performance of the speech processing employing the DNN 120. Embodiments disclosed herein employ a batch setting value to control a frequency of read-modify-write accesses to store the output values of the neurons to optimize utilization of the memory bandwidth.

Embodiments disclosed herein employ a technique termed herein as Fan-Out/Fan-In N with zero-skip, wherein N corresponds to the batch setting disclosed above. In accordance with Fan-Out/Fan-In N with zero-skip, N non-zero input neurons are selected from a previous layer of the DNN 120, skipping any zero-skip neurons, wherein zero-skip neurons have null input values. A given output neuron of a current layer (which is a next layer to the previous layer) is selected and an incremental output value is computed for the selected given output neuron as a function of values of the N non-zero of the selected N input neurons in combination with N weights (e.g., N connections fanning in to the selected given output neuron or N connections fanning out from the selected N input neurons) between the selected N non-zero input neurons and the selected given output neuron. The memory storing the output value for the given neuron may be updated to include the computed incremental output value, once per N non-zero input neurons to reduce a number of memory accesses to enable embedded platforms with limited hardware resources to be used as platforms for speech processing in real-time.

Figure 2A:
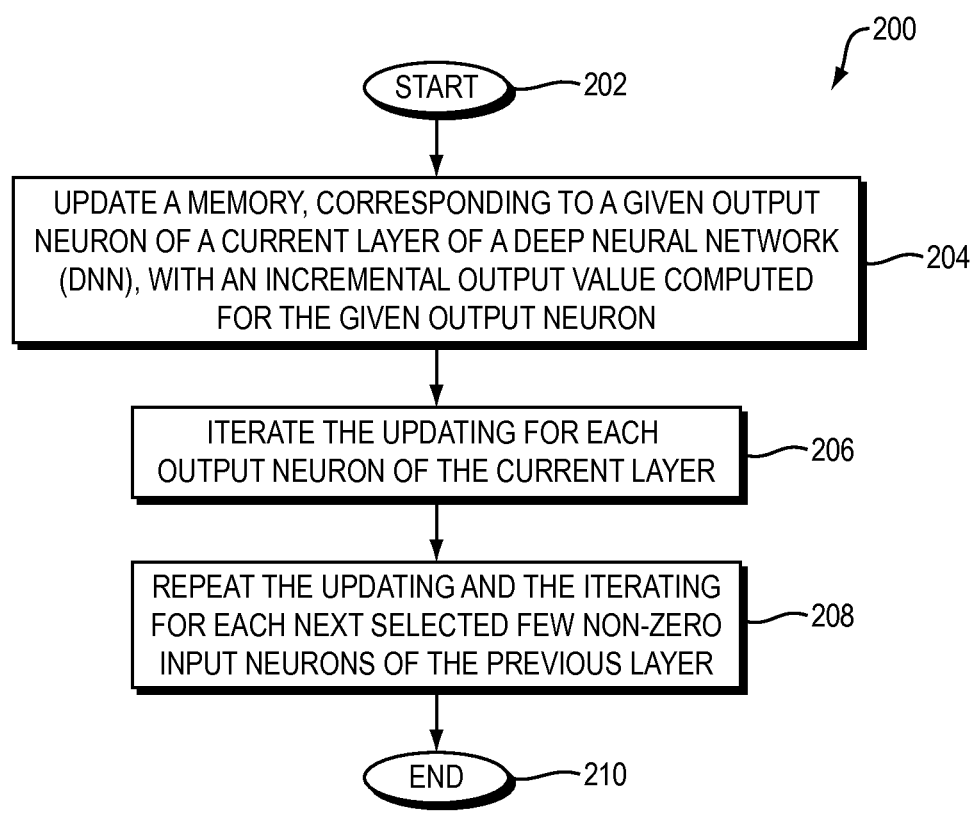
FIG. 2A is a flow diagram of an example embodiment of a method for improving computation time of speech recognition processing in an electronic device.

FIG. 2A is a flow diagram 200 of an example embodiment of a method for improving computation time of speech recognition processing in an electronic device. The method may start (202) and, by a processor, update a memory, corresponding to a selected given output neuron of a current layer of a Deep Neural Network (DNN), with an incremental output value computed for the selected given output neuron as a function of values of a selected few non-zero input neurons of a previous layer of the DNN in combination with weights between the selected few non-zero input neurons and the selected given output neuron, wherein a number of the selected few corresponds to a batch setting (204). The method may iterate the updating for each output neuron of the current layer (206) and repeat the updating and the iterating for each next selected few non-zero input neurons of the previous layer to reduce a rate of accessing the memory based on the batch setting to improve the computation time of the speech recognition processing (208). The method thereafter ends (210) in the example embodiment.

Figure 4:
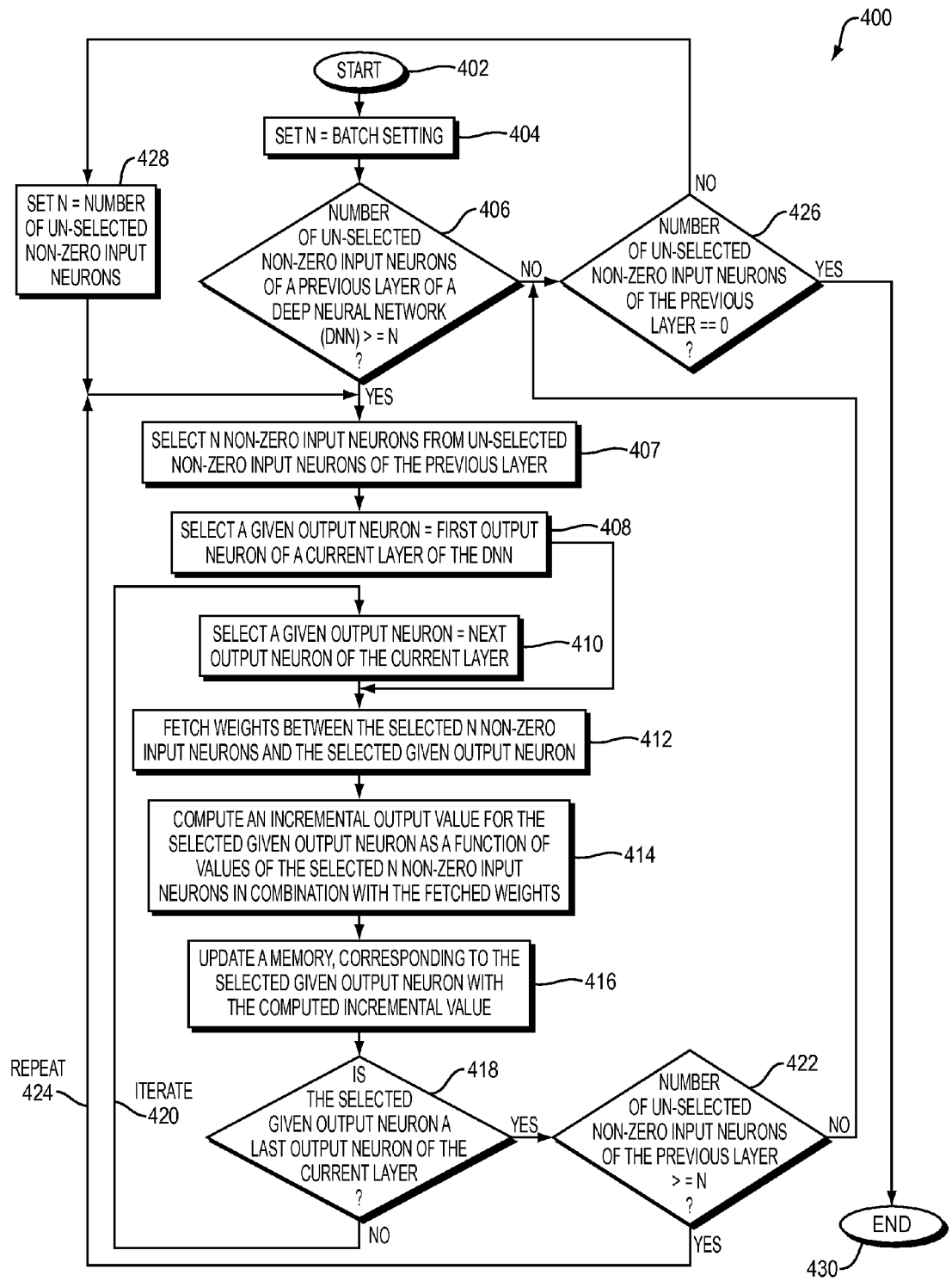
FIG. 4 is a block diagram of another example embodiment of a method for improving computation time of speech recognition processing in an electronic device.

It should be understood that the terms "iterate" and "repeat" are interchangeable as used herein; however, for clarity, both terms are used herein each with a respective context, such as shown in FIG. 4, described below.

Figure 2B:
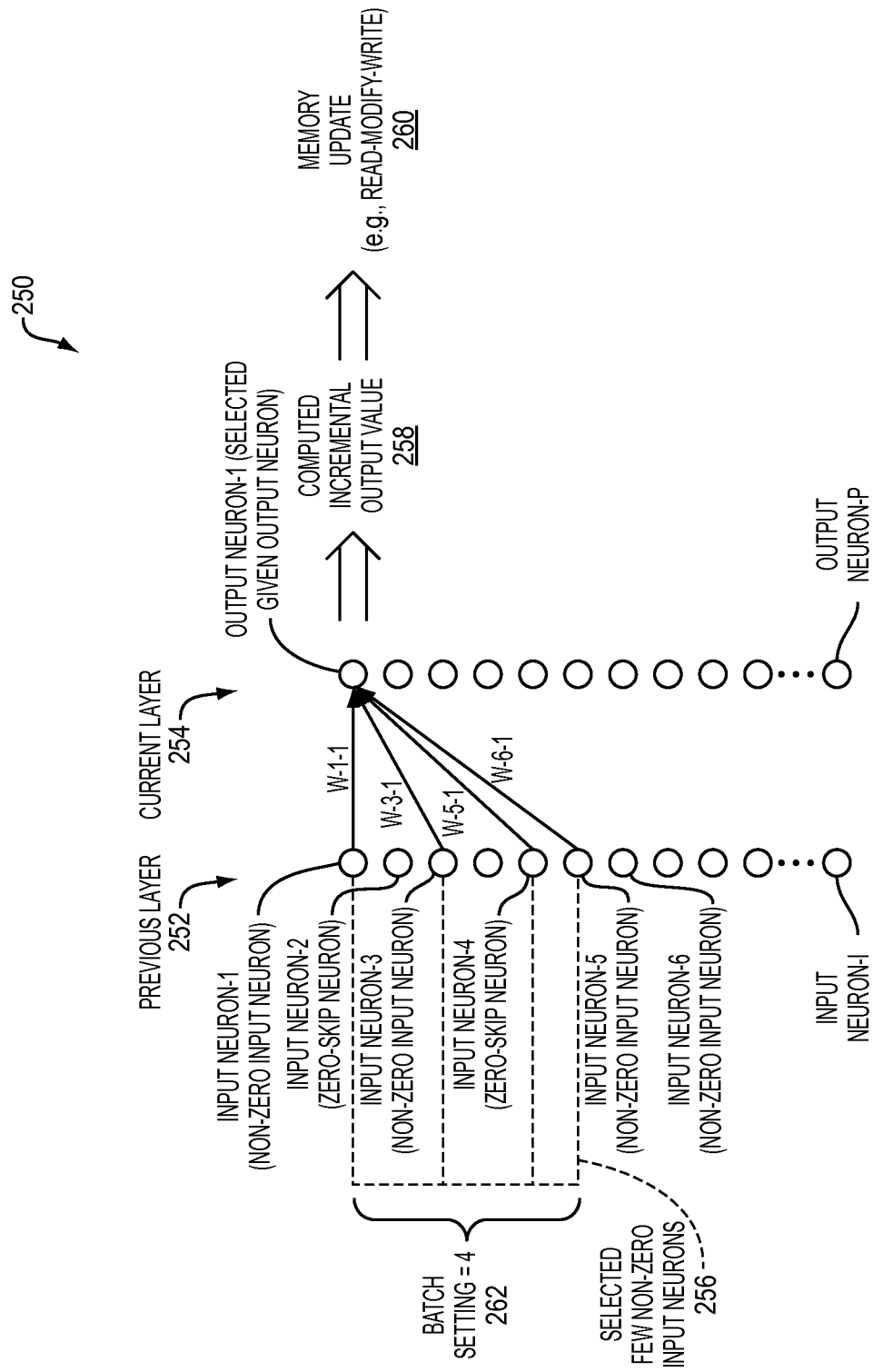
FIG. 2B is block diagram of an example embodiment of an iteration for updating a memory corresponding to a selected given output neuron of a current layer of a Deep Neural Network (DNN).

FIG. 2B is block diagram 250 of an example embodiment of an iteration for updating a memory (not shown), such as the memory-a 132a of FIG. 1, corresponding to a selected given output neuron, i.e., output neuron-1, of a current layer 254 of a DNN (not shown), such as the DNN 120 of FIG. 1. The memory may correspond to the selected given output neuron because the memory may be configured to store an output value being computed for the selected given output neuron. It should be understood that one or more locations of the memory may be allocated for storing the output value of the selected output neuron and that the memory may be configured in any suitable manner that enables the output value to be stored therein. According to embodiments disclosed herein, the output value of the selected given output neuron may be computed based iteratively computing an incremental output value 258 of the output value, wherein the memory is updated 260 for the selected given output neuron once per iteration of the computing of the incremental output value 258 for the selected given output neuron, as disclosed below.

In the example embodiment of FIG. 2B, a previous layer 252 of the DNN may include a plurality of I input neurons (i.e., input neuron-1, input neuron-2, input neuron-3, input neuron-4, input neuron-5, . . . input neuron-I), and the current layer 254 of the DNN may include a plurality of P output neurons (i.e., output neuron-1, . . . output neuron-P). In the example embodiment, each input neuron of the plurality of I input neurons of the previous layer 252 has an associated input value (not shown), whereas output values of each of the plurality of P output neurons is to be computed.

An input neuron associated with a non-zero input value may be referred to interchangeably herein as a non-zero input neuron, whereas an input neuron associated with a null input value may be referred to interchangeably herein as a zero-skip neuron. Each input neuron of the plurality of I input neurons, regardless of whether the input neuron is a non-zero input neuron or a zero-skip input neuron, may have one or more connections (also referred to interchangeably herein as links or weights) between a respective input neuron and one or more of the P output neurons. For simplicity, only weights between a selected few non-zero input neurons 256 of the previous layer 252 and the selected given output neuron (i.e., output neuron-1) are shown.

In the example embodiment of FIG. 2B, the weights w-1-1, w-3-1, w-5-1, and w-6-1 are configured between the selected few non-zero input neurons 256 (i.e., input neuron-1, input neuron-3, input neuron-5, and input neuron-6) and the selected given output neuron (i.e., output neuron-1), respectively. According to embodiments disclosed herein, a batch setting 262 may be configured and corresponds to a number of the selected few non-zero input neurons 256, which is four, in the example embodiment. It should be understood that the batch setting 262 may be any suitable value selected advantageously based on hardware resources available.

For example, embodiments disclosed herein may configured the batch setting such that a number of registers of the electronic device may be used for loading the non-zero input values and the associated weights for computation. As some architectures may have a limited amount of hardware registers available, such as 8-32 hardware registers, the batch setting may be configured to enable efficient computation in view of the limited hardware registers available. As such, a value of the batch setting may be small, such as 2, 4, or any other suitable value based on the hardware architecture. Further, as the weights may be stored in different weight arrays that are not co-located, a given hardware architecture or distribution of stored weights therein may limit the number of simultaneous memory streams that may be retrieved from different address locations efficiently (i.e., without memory read bandwidth reduction). As such, the batch setting may be advantageously configured in view of same for efficiency. According to embodiments disclosed herein, the batch setting may be a value of at least two.

In the example embodiment of FIG. 2B, the incremental output value 258 may be computed for the selected given output neuron (i.e., output neuron-1) as a function of input values of the selected few non-zero input neurons 256 (i.e., input neuron-1, input neuron-3, input neuron-5, and input neuron-6) of the previous layer 252 of the DNN in combination with the weights (i.e., w-1-1, w-3-1, w-5-1, and w-6-1) that are between the selected few non-zero input neurons 256 and the selected given output neuron (i.e., output neuron-1). In the example, embodiment, the batch setting 262 is four.

According to embodiments disclosed herein, in a given iteration, a number N of un-selected non-zero input neurons of the plurality of input neurons of the previous layer may be selected and correspond to the selected few non-zero input neurons, wherein N is initially configured to a value of the batch setting 262. In the example embodiment of FIG. 2B, the iteration may correspond to a first iteration in which the plurality of non-zero input neurons of the plurality of I input neurons are un-selected input neurons of the previous layer 252, that is, the input values associated with each of the plurality of I input neurons have yet to be processed for computing output values of the output neurons of a next layer (i.e., the current layer 254). As such, the selected few non-zero input neurons 256 correspond to the first four non-zero input neurons, skipping any zero-skip neurons, such as the zero-skip neurons input neuron-2 and input neuron-4, encountered.

In the given iteration of the example embodiment of FIG. 2B, a first output neuron of the current layer 254 may be selected, such as the selected given output neuron that is output neuron-1 in the example embodiment. The output neuron-1 may be selected because an incremental output value has not been computed for output neuron-1 based on the selected few non-zero input neurons 256. The weights (i.e., w-1-1, w-3-1, w-5-1, and w-6-1) between the selected few non-zero input neurons 256 and the selected given output neuron, may be fetched and the incremental output value 258 may be computed and the memory update 260 may subsequently follow to update a current output value stored in the memory for the selected given output neuron. Selecting of the few non-zero input neurons 256 may include loading their respective input values into hardware registers, to enable use of the respective input values to update each output value without reloading the respective input values from a memory, thus, saving memory bandwidth by obviating memory accesses otherwise needed to obtain the respective input values from the memory.

The incremental output value 258 may be computed by incrementally updating a given hardware register as a function of each input value of the selected few non-zero input neurons 256 and a respective weight of the weights (i.e., w-1-1, w-3-1, w-5-1, and w-6-1) between the selected few non-zero input neurons 256 and the selected given output neuron. For example, the given hardware register may be updated based on the input value of the non-zero input neuron-1 and the weight w-1-1, followed by a next update to the given register based on the input value of a next non-zero input neuron, i.e., input neuron-3, and a next weight w-3-1, and so forth. The memory update 260 may include updating the memory with the computed incremental output value 258 that may be a value stored in the given hardware register that is an accumulation of each weighted input of each input neuron of the selected few non-zero input neurons 256.

It should be understood that the memory update 260 may be performed in any suitable manner, such as a read-modify-write operation. For example, the memory update 260 may include a read-modify-write to a memory location corresponding to the output value of the selected given output neuron to add the computed incremental output value 258 to a current value stored therein. According to embodiments disclosed herein, a next memory update 260 of the output value of the selected given output neuron (i.e., output neuron-1) may be performed in a later iteration, such as the iteration of FIG. 3G, disclosed below, that follows a given number of iterations for updating subsequent next output neurons of the plurality of P output neurons. The subsequent next output neurons of the plurality of P output neurons may have output values updated in corresponding memories with incremental values computed as a function of the input values of the selected few non-zero input neurons 256 in combination with respective weights between the selected few non-zero input neurons 256 and those subsequent next output neurons, such as shown in the iterations of FIGS. 3C-3F, disclosed below.

Figures 3A, 3B:
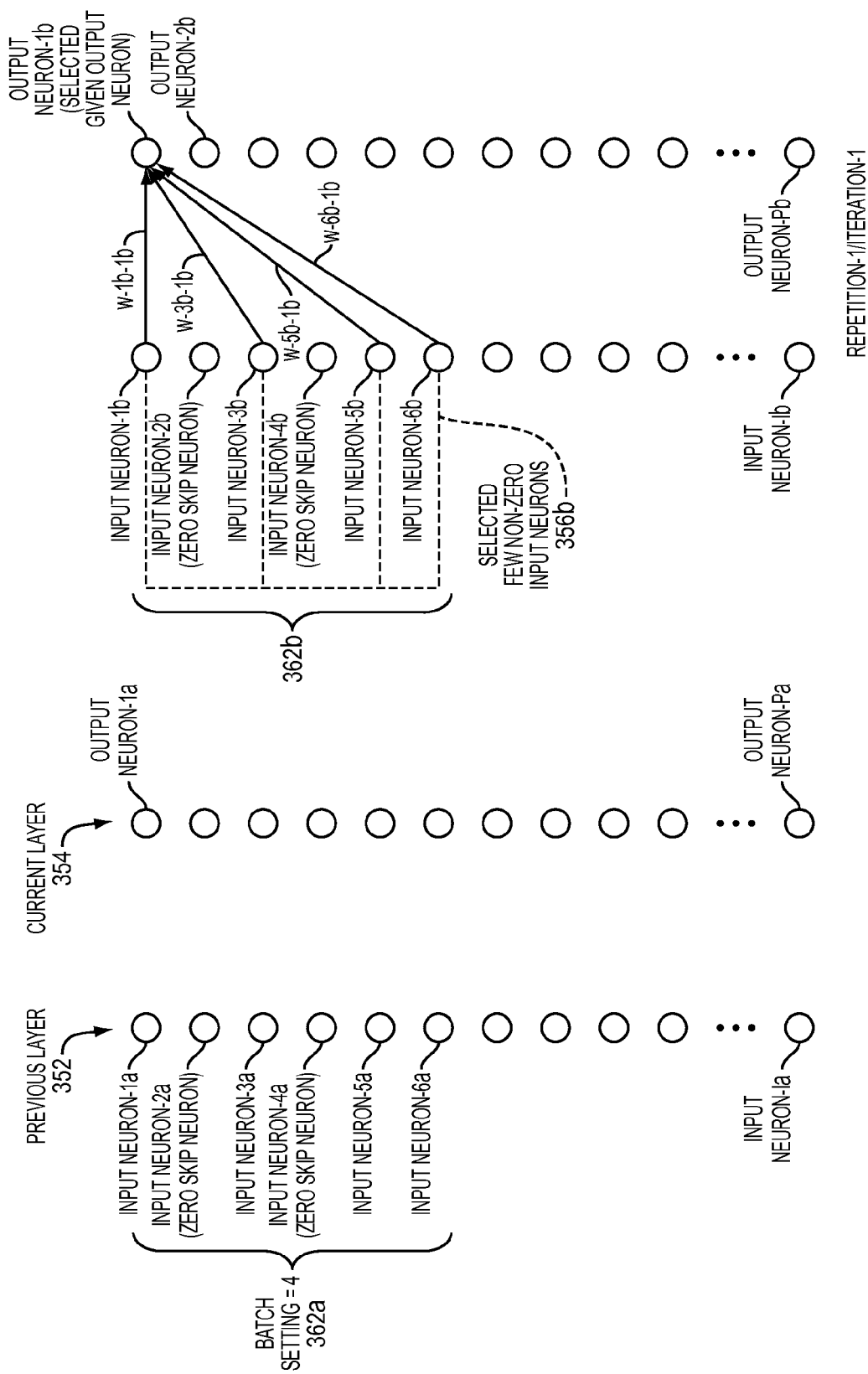
FIGS. 3A-G are other block diagrams of example embodiments of iterations for updating a memory corresponding to a selected given output neuron of the current layer of the DNN.

FIGS. 3A-G are other block diagrams of example embodiments of iterations for updating a memory corresponding to a selected given output neuron of a current layer of a Deep Neural Network (DNN). In the example embodiments of FIGS. 3A-G, it should be understood that the previous layer 352 of input neurons of FIG. 3A is the same previous layer, with the same input neurons, in each of the FIGS. 3A-G. Likewise, the current layer 354 of output neurons of FIG. 3A is the same current layer, with the same output neurons, in each of the FIGS. 3A-G. For simplicity, the previous layer 352 and the current layer 354 are only labeled on FIG. 3A and not throughout each of the FIGS. 3B-G.

Further, for simplicity, not all neurons are labeled. Since each neuron of the previous layer 352 and the current layer 354 of FIG. 3A is replicated in each of the FIGS. 3B-G, a reference indicator for the same neuron includes a same label and base number, but with a change in suffix between the figures for clarity. It should also be understood that for simplicity, all connections (i.e., links or weights) are not shown between the input neurons of the previous layer and the output neurons of the current layer in the FIGS. 3A-G.

In the example embodiment of FIG. 3A, all of the input neurons of the previous layer 352 are un-selected neurons of a layer of a DNN, such as the DNN 120 of FIG. 1. All of the input neurons of the previous layer 352 may be un-selected neurons as none of the input neurons have been selected for computation of an output value of an output neuron of a next layer (i.e., the current layer 354) of the DNN. In the example embodiments of FIGS. 3A-G, a value of a batch setting, such as the batch setting 362a of FIG. 3A and 362g of FIG. 3G is again four; however, as disclosed above, the value of the batch setting 362a, 362, or 362g may be any suitable setting.

In the example embodiment of FIG. 3A, the previous layer 352 of the DNN includes a plurality of I input neurons (input neuron-1a, input neuron-2a, input neuron-3a, input neuron-4a, input neuron-5a, . . . input neuron-Ia), and the current layer 254 of the DNN includes a plurality of P output neurons (output neuron-1a, . . . output neuron-Pa). The first four non-zero input neurons include input neuron-1a, input neuron-2a, input neuron-5a, and input neuron-6a, wherein the zero-skip neurons (i.e., input neuron-2a and input neuron-4a) are skipped. As such, as shown in the example embodiment of FIG. 3B, wherein a number of the selected few corresponds to the batch setting 362b (i.e., four, in the example embodiment), the selected few non-zero input neurons 356b include the input neuron-1b, input neuron-2b, input neuron-5b, and input neuron-6b since the input neuron-2b and input neuron-4b are skipped.

According to embodiments disclosed herein, an incremental output value may be computed for each output neuron of the plurality of P output neurons (output neuron-1b, output neuron-2b, . . . output neuron-Pb) of the current layer as a function of the input values of the selected few non-zero input neurons 356b of the previous layer in combination with weights between the selected few non-zero input neurons and a selected given output neuron of the plurality of P output neurons (output neuron-1b, output neuron-2b, . . . output neuron-Pb).

Each iteration for computing a respective incremental output value for each next output neuron may be considered part of the same repetition, as the same selected few non-zero input neurons are employed for each iteration. For example, FIGS. 3B-3F are example embodiments showing iterations for the same repetition (i.e., Repetition-1) in which the same selected few non-zero input neurons are employed. According to embodiments disclosed herein, a memory update (not shown), such as the memory update 260 of FIG. 2B, is performed for each iteration to update a respective output value for the selected given output neuron of the iteration.

For example, in the example embodiment of FIG. 3B, a first repetition/first iteration (i.e., Repetition-1/Iteration-1) may update the memory, corresponding to the selected given output neuron-1b of the current layer, with an incremental output value computed for the selected given output neuron-1b as a function of input values of the selected few non-zero input neurons 356b (i.e., input neuron-1b, input neuron-2b, input neuron-5b, and input neuron-6b) of the previous layer in combination with the weights (i.e., w-1b-1b, w-3b-1b, w-5b-1b, and w-6b-1b) between the selected few non-zero input neurons and the selected given output neuron-1b.

Figure 3D:
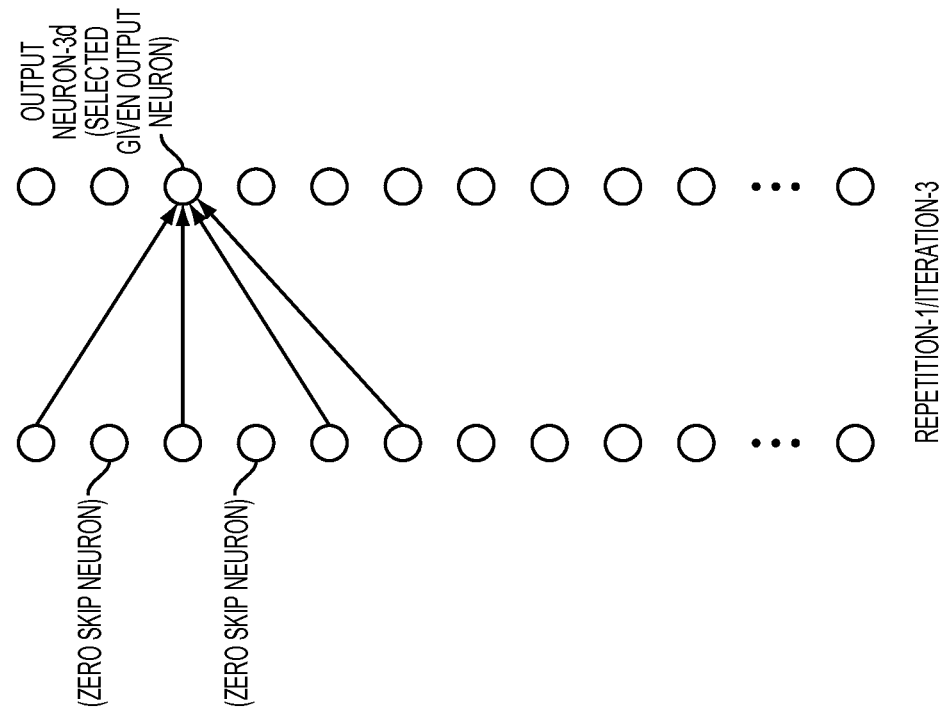
Figure 3C:
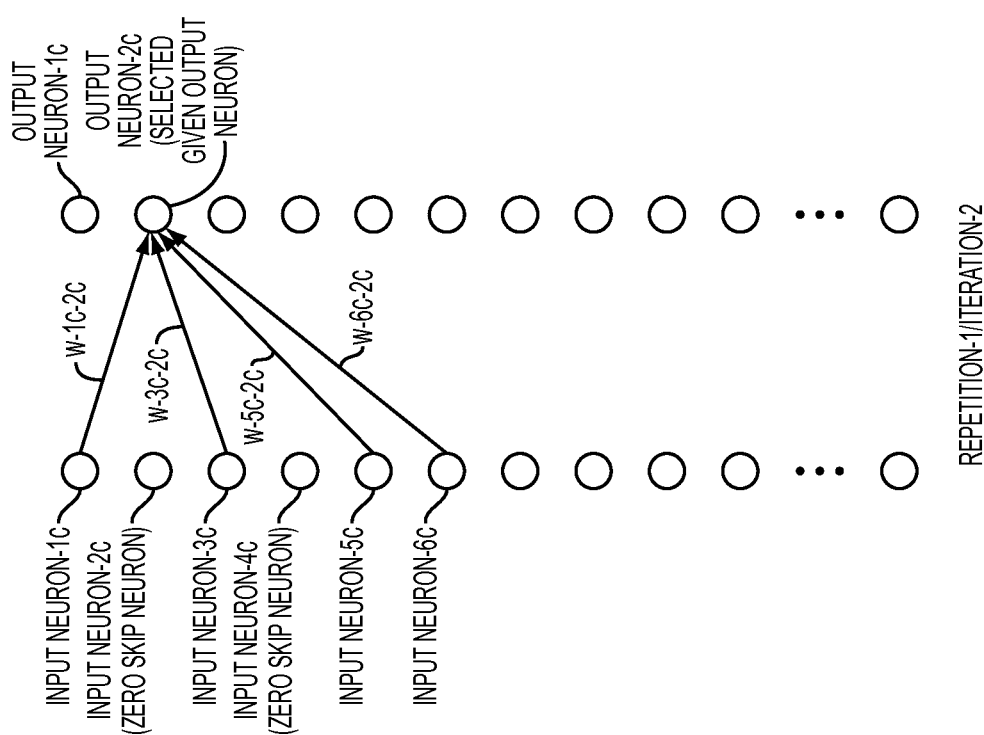

In the example embodiment of FIG. 3C, a next output neuron may be selected and a first repetition/second iteration (i.e., Repetition-1/Iteration-2) may update the memory, corresponding to a next selected output neuron of the currently layer, such as the selected given output neuron-2c, with an incremental output value computed for the selected given output neuron-2c as a function of the input values of the selected few non-zero input neurons 356b (i.e., input neuron-1c, input neuron-2c, input neuron-5c, and input neuron-6c of FIG. 3C), in combination with the weights (i.e., w-1c-2c, w-3c-2c, w-5c-2c, and w-6c-2c) between the selected few non-zero input neurons and the selected given output neuron (i.e., output neuron-1c).

Figure 3F:
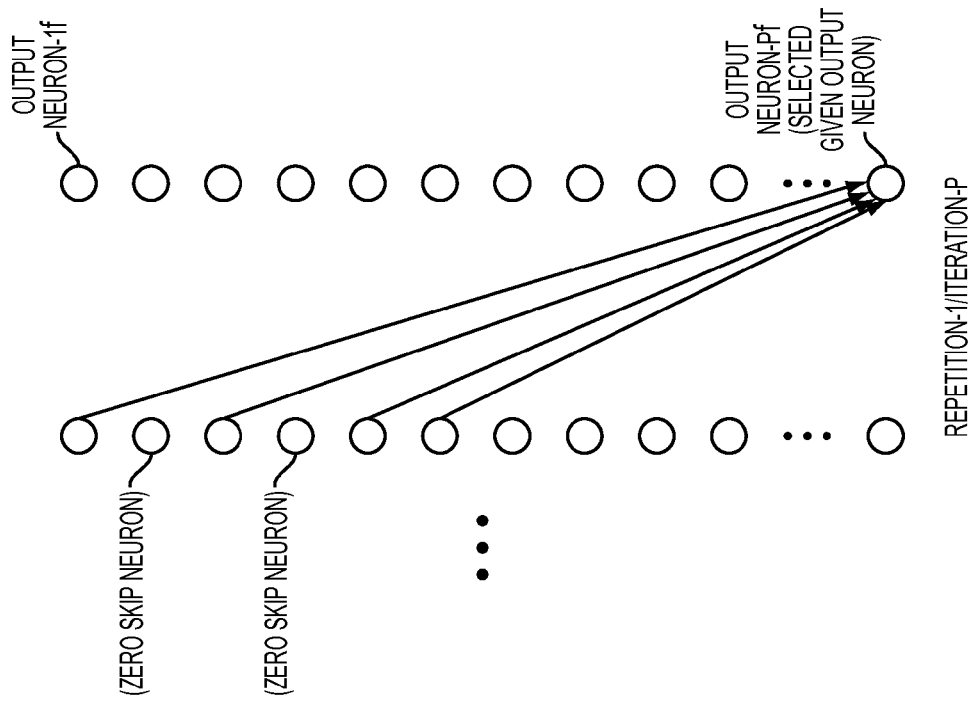
Figure 3E:
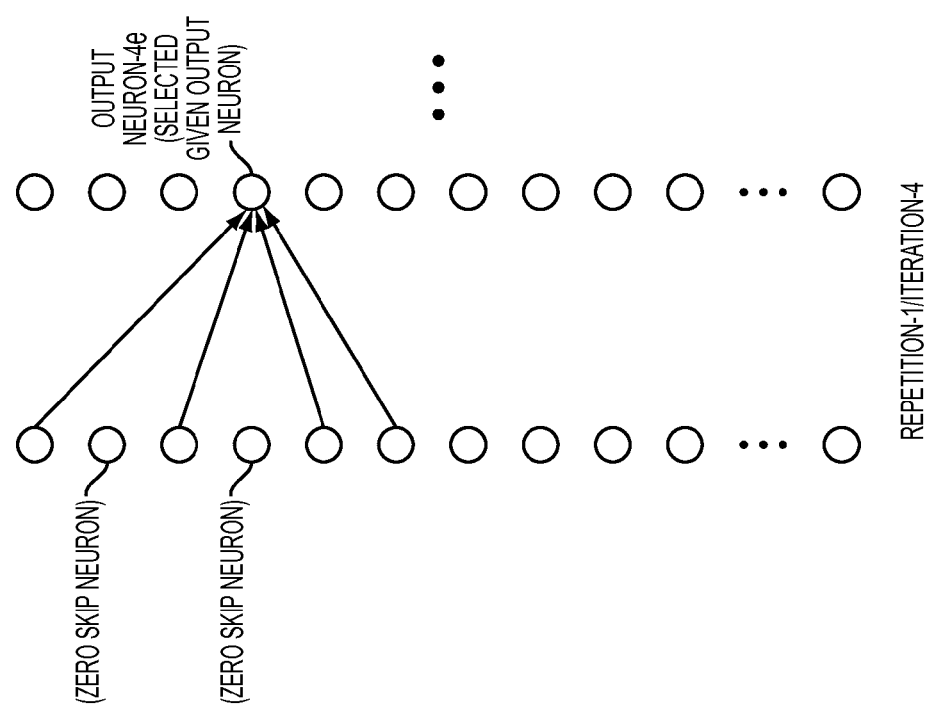

Similarly, each next iteration of the Repetition-1 may update the memory corresponding to each next selected given output neuron, such as the output neuron-3d of FIG. 3D, the output neuron-4e of FIG. 3E, and so forth, until a last iteration of the repetition, i.e., Iteration-P of the Repetition-1 shown in FIG. 3F, updates the memory corresponding to the last neuron (i.e., output neuron-Pf) that is the selected given output neuron as shown in FIG. 3F.

Figure 3G:
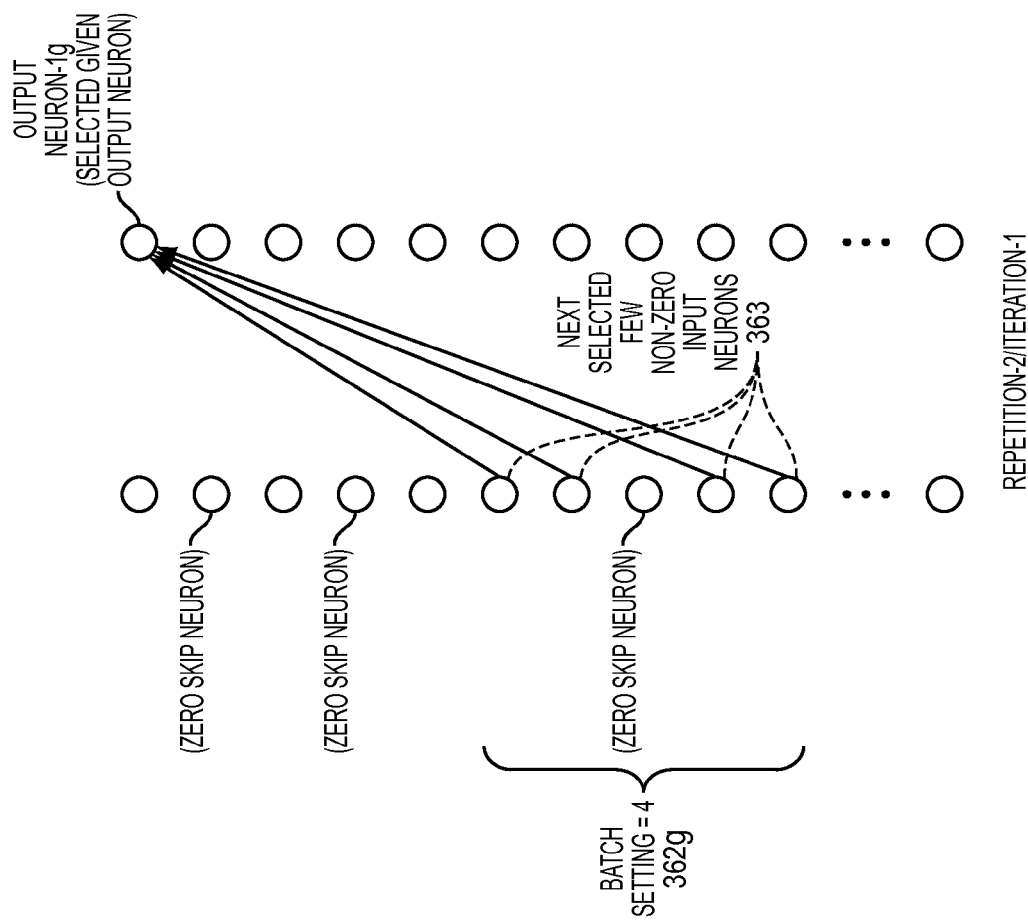

In an event un-selected non-zero input neurons remain in the previous layer, a next repetition (i.e., Repetition-2) may begin, by selecting a next selected few non-zero input neurons 363, wherein a number of the next selected few non-zero input neurons corresponds to the batch setting 362g of FIG. 3G. A next repetition (i.e., Repetition-2) may begin and again update the memory that corresponds to the first output neuron (i.e., output neuron-1g) of the current layer, which was updated in the Repetition-1/Iteration-1 of FIG. 3B; however, computing of the incremental output value of the first output neuron (i.e. , output neuron-1g) in Repetition-2/Iteration-1 employs the next selected few non-zero input neurons 363 and Repetition-2 may proceed with iterations for updating memories corresponding to the other output neurons as disclosed above but with input values and corresponding weights associated with the next selected few non-zero input neurons 363.

At some point a number of un-selected non-zero input neurons of the previous layer may be determined to be null or fewer than the batch setting. In an event the number is null, the repeating of the iterating and updating may terminate. In an event the number is fewer than the batch setting, a last set of iterations may proceed with a number of the next selected few non-zero input neurons set to the number of un-selected non-zero input neurons remaining Alternatively, non-zero inputs that are lacking may be processed with input values set to null and corresponding weights for those lacking non-zero inputs may be those used for a last non-zero input that was previously processed.

FIG. 4 is a flow diagram 400 of another example embodiment of a method for improving computation time of speech recognition processing in an electronic device. The method may start (402) and set a value N to a batch setting value (404). The batch setting value may be a pre-determined value based on limited resources, such as registers, available for loading N input neuron values and N associated weights. The method may perform an initial check for whether a number of un-selected non-zero input neurons of a previous layer of a Deep Neural Network (DNN) is greater than or equal to the value N (406). If yes, the method may select N non-zero input neurons from un-selected non-zero input neurons of the previous layer (407) and select a given output neuron that is a first output neuron of a current layer of the DNN (408). The method may fetch weights between the selected N non-zero input neurons and the selected given output neuron (412). The method may compute an incremental output value for the selected given output neuron as a function of values of the selected N non-zero input neurons in combination with the fetched weights (414) and update a memory, corresponding to the selected given output neuron with the computed incremental value (416). Selecting of the N non-zero input neurons may include loading their respective values into hardware registers, to enable use of the respective values to update each output value without reloading, thus, saving memory bandwidth.

The method may check if the selected given output neuron is a last output neuron of the current layer (418). If no, the method may iterate (420) and select a given output neuron that is a next output neuron of the current layer (410) and continue at (412) as disclosed above. However, in the event the check at (418) determines that the given output neuron is the last output neuron, the method checks for whether the number of un-selected non-zero input neurons remaining in the previous layer is greater than or equal to N (422). If yes, the method may repeat (424) and select another N non-zero input neurons from the un-selected non-zero input neurons of the previous layer (407) and continue as disclosed above.

If at (422) the number of un-selected non-zero input neurons remaining in the previous layer is fewer than N, the method may check if there are zero un-selected non-zero input neurons remaining (426). If yes, the method thereafter ends (430) in the example embodiment. If no, the method may set N to the number of remaining un-selected non-zero input neurons of the previous layer (428), select the N non-zero input neurons at (407) and continue as disclosed above.

Similarly, if the initial check for whether a number of un-selected non-zero input neurons of the previous layer is greater than or equal to N (406) is no, the method may check if there are zero un-selected non-zero input neurons remaining (426). If no, the method may set N to the number of remaining un-selected non-zero input neurons of the previous layer (428), select the N non-zero input neurons at (407) and continue as disclosed above. If yes, the method thereafter ends (430) in the example embodiment.

According to another embodiment, the memory size of a DNN, such as the DNN 120 of FIG. 1 may be reduced. In the example embodiment, neural network weights may be compressed lossless from 16/8 bits to 8/4 bits and out-of-range weights may be handled by a sparse matrix. Fetching of weights, as disclosed above may include fetching the weights from a plurality of weight data structures stored in at least one memory of the speech recognition system, wherein a portion of the plurality of the weight data structures may be stored in different memories of the at least one memory. A first portion of the weights may be compressed and a second portion of the weights may be un-compressed. As most weights are small the number of out-of-range weights in the second portion will be small. The second portion may have weight values exceeding a range of the first portion and the second portion may be stored separately from the first portion. The second portion may be stored in a sparse matrix. According to embodiments disclosed herein, the weights may be compressed via a representation of fewer bits. Further, in an event weights are considered out-of-range, that is, exceeding a given bit length of a given storage device, since such out-of-range weights may be stored separately, embodiments disclosed herein may handle incremental output values via another pass that computes incremental output values based on the out-of-range weights and update respective memory storing a corresponding output value.

After all outputs have been computed based on all non-zero inputs and all compressed weights, a subsequent pass may be used to update the output values based on just the few links with out-of-range weights. Each of the out-of-range weights may be stored together with the number of the input neuron and the number of the output neuron the weight (i.e., link) is between. The subsequent pass may read each of the out-of-range weights and update the corresponding output value of a respective output neuron based on the weight and the corresponding input value of a respective input neuron.

Figure 5:
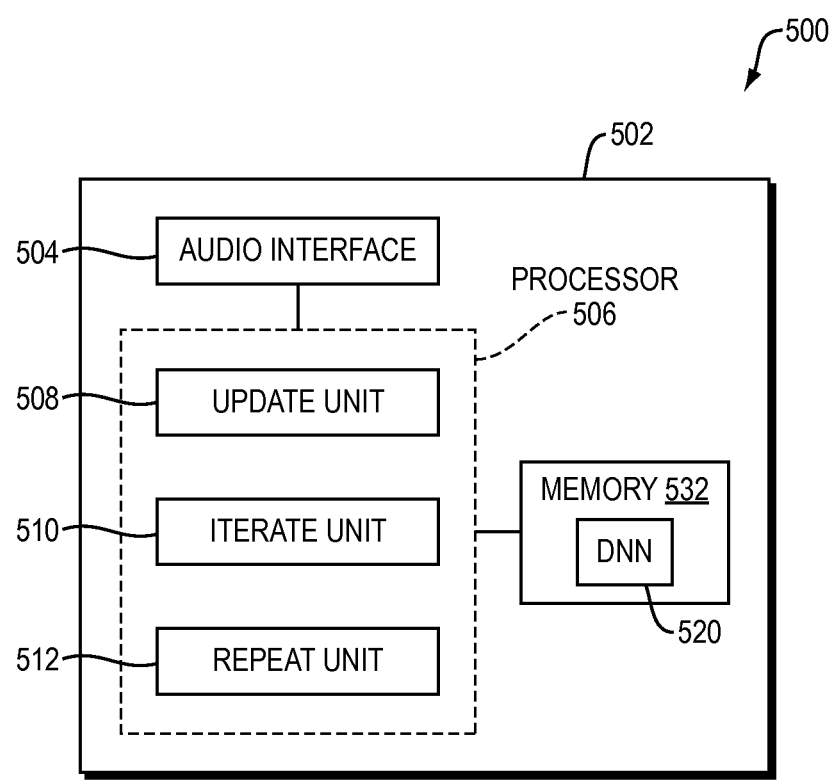
FIG. 5 is a block diagram of an example embodiment of an apparatus for improving computation time of speech recognition processing.

FIG. 5 is a block diagram 500 of an example embodiment of an apparatus 502 for improving computation time of speech recognition processing. The apparatus 502 may include an audio interface 504 coupled to a processor 506 of the apparatus 502 and, by the processor 506: an update unit 508 may update a memory 532, corresponding to a selected given output neuron of a current layer of a Deep Neural Network (DNN) 520, with an incremental output value computed for the selected given output neuron as a function of input values of a selected few non-zero input neurons of a previous layer of the DNN 520 in combination with weights between the selected few non-zero input neurons and the selected given output neuron, wherein a number of the selected few corresponds to a batch setting. The apparatus 502 may further comprise an iterate unit 510 to iterate the updating for each output neuron of the current layer, and a repeat unit 512 to repeat the updating and the iterating for each next selected few non-zero input neurons of the previous layer to reduce a rate of accessing the memory based on the batch setting to improve the computation time of the speech recognition processing.

FIG. 6 is a block diagram of an example of an embodiment of an internal structure of a computer 600 in which various embodiments disclosed herein may be implemented. The computer 600 contains system bus 602, where a bus is a set of hardware lines used for data transfer among the components of a computer or processing system. Bus 602 is essentially a shared conduit that connects different elements of a computer system (e.g., processor, disk storage, memory, input/output ports, network ports, etc.) that enables the transfer of information between the elements. Coupled to system bus 602 is I/O device interface 604 for connecting various input and output devices (e.g., keyboard, mouse, displays, printers, speakers, etc.) to the computer 600. Network interface 606 allows the computer 600 to connect to various other devices attached to a network. Memory 608 provides volatile storage for computer software instructions 610 and data 612 may be used to implement embodiments disclosed herein. Disk storage 614 provides non-volatile storage for computer software instructions 610 and data 612 that may be used to implement embodiments disclosed herein. Central processor unit 618 is also coupled to system bus 602 and provides for the execution of computer instructions.

The teachings of all patents, published applications and references cited herein are incorporated by reference in their entirety.

Further example embodiments of the present invention may be configured using a computer program product; for example, controls may be programmed in software for implementing example embodiments of the present invention. Further example embodiments of the present invention may include a non-transitory computer readable medium containing instructions that may be loaded and executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method for improving computation time of speech recognition processing in an electronic device, the method comprising:

by a processor:
updating a current output value stored in a memory, the current output value corresponding to a selected given output neuron of a current layer of a Deep Neural Network (DNN), the current output value being updated with an incremental output value computed for the selected given output neuron as a function of input values of a selected few non-zero input neurons of a previous layer of the DNN in combination with weights between the selected few non-zero input neurons and the selected given output neuron, the selected few non-zero input neurons selected by skipping zero-skip neurons of the previous layer that have null input values for combining with respective weights for the updating, wherein a number of neurons for the selected few corresponds to a batch setting;
iterating the updating for each output neuron of the current layer to update respective current output values, stored in the memory, with respective incremental output values computed for the respective output neurons; and
repeating the updating and the iterating for each next selected few non-zero input neurons of the previous layer to reduce a rate of accessing the memory based on the batch setting to improve the computation time of the speech recognition processing.

2. The method of claim 1, wherein the batch setting is a value of at least two neurons.

3. The method of claim 1, further comprising:
selecting the few non-zero input neurons from a plurality of input neurons of the previous layer of the DNN, wherein the few non-zero input neurons have non-zero input for the updating;
selecting the given output neuron;
fetching the weights between the selected few non-zero input neurons and the given output neuron; and
computing the incremental output value.

4. The method of claim 3, wherein the computing further includes employing Single Instruction Multiple Data (SIMD) instructions.

5. The method of claim 1, further comprising selecting the few non-zero input neurons and terminating the repeating, iterating, and updating in an event each non-zero input neuron has been selected.

6. The method of claim 1, further comprising:
selecting the few non-zero input neurons; and
in an event a remaining number of un-selected non-zero input neurons is fewer than the batch setting, the number of the selected few corresponds to the remaining number.

7. The method of claim 1, wherein the method further comprises:
receiving at least one speech signal over a speech interface;
producing at least one feature vector from the at least one speech signal received; and
applying the DNN to the at least one feature vector to compute at least one output feature vector for producing at least one speech recognition result.

8. The method of claim 1, further comprising fetching the weights from a plurality of weight data structures stored in at least one memory of the speech recognition system and wherein a portion of the plurality of the weight data structures are stored in different memories of the at least one memory.

9. The method of claim 1, further comprising:
compressing a first portion of the weights;
maintaining a second portion of the weights un-compressed, the second portion having weight values exceeding a range of the first portion, the second portion stored separately from the first portion; and
in an event all output values of all output neurons of the current layer have been computed based on all non-zero input values of all non-zero input neurons of the previous layer in combination with all compressed weights, performing a subsequent pass to update each output value of each output neuron of the current layer based on input values of input neurons in combination with un-compressed weights.

10. The method of claim 9, wherein the second portion is stored in a sparse matrix.

11. An apparatus for improving computation time of speech recognition processing in an electronic device, the apparatus comprising:
a processor, the processor configured to:
update a current output value stored in a memory, the current output value corresponding to a selected given output neuron of a current layer of a Deep Neural Network (DNN), the current output value being updated with an incremental output value computed for the selected given output neuron as a function of input values of a selected few non-zero input neurons of a previous layer of the DNN in combination with weights between the selected few non-zero input neurons and the selected given output neuron, the selected few non-zero input neurons selected by skipping zero-skip neurons of the previous layer that have null input values for combining with respective weights for the update operation, wherein a number of neurons for the selected few corresponds to a batch setting;
iterate the update operation for each output neuron of the current layer to update respective current output values, stored in the memory, with respective incremental output values computed for the respective output neurons; and
repeat the update and iterate operations for each next selected few non-zero input neurons of the previous layer to reduce a rate of accessing the memory based on the batch setting to improve the computation time of the speech recognition processing.

12. The apparatus of claim 11, wherein the batch setting is a value of at least two neurons.

13. The apparatus of claim 11, wherein the processor is further configured to:
select the few non-zero input neurons from a plurality of input neurons of the previous layer of the DNN, wherein the few non-zero input neurons have non-zero input values for the update operation;
select the given output neuron;
fetch the weights between the selected few non-zero input neurons and the given output neuron; and
compute the incremental output value.

14. The apparatus of claim 11, wherein the processor is further configured to employ Single Instruction Multiple Data (SIMD) instructions to compute the incremental output value.

15. The apparatus of claim 11, wherein the processor is further configured to select the few non-zero input neurons, terminate the repeat operation, terminate the iterate operation, and terminate the update operation in an event each non-zero input neuron has been selected.

16. The apparatus of claim 11, wherein the processor is further configured to:
select the few non-zero input neurons; and
in an event a remaining number of un-selected non-zero input neurons is fewer than the batch setting, the number of the selected few corresponds to the remaining number.

17. The apparatus of claim 11, wherein the apparatus further comprises:
an audio interface configured to receive at least one speech signal over a speech interface;
a speech recognition front-end configured to produce at least one feature vector from the at least one speech signal received; and
wherein the processor is further configured to apply the DNN to the at least one feature vector to compute at least one output feature vector for producing at least one speech recognition result.

18. The apparatus of claim 11, further wherein the processor is further configured to fetch the weights from a plurality of weight data structures stored in at least one memory of the speech recognition system and wherein a portion of the plurality of the weight data structures are stored in different memories of the at least one memory.

19. The apparatus of claim 11, wherein the processor is further configured to:
compress a first portion of the weights;
maintain a second portion of the weights un-compressed, the second portion having weight values exceeding a range of the first portion, the second portion stored in a sparse matrix separately from the first portion; and
in an event all output values of all output neurons of the current layer have been computed based on all non-zero input values of all non-zero input neurons of the previous layer in combination with all compressed weights, performing a subsequent pass to update each output value of each output neuron of the current layer based on input values of input neurons in combination with un-compressed weights.

20. A non-transitory computer-readable medium having encoded thereon a sequence of instructions which, when executed by a processor, causes the processor to:
update a current output value stored in a memory, the current output value corresponding to a selected given output neuron of a current layer of a Deep Neural Network (DNN), the current output value being updated with an incremental output value computed for the selected given output neuron as a function of input values of a selected few non-zero input neurons of a previous layer of the DNN in combination with weights between the selected few non-zero input neurons and the selected given output neuron, the selected few non-zero input neurons selected by skipping zero-skip neurons of the previous layer that have null input values for combining with respective weights for the update operation, wherein a number of neurons for the selected few corresponds to a batch setting;
iterate the updating for each output neuron of the current layer to update respective current output values, stored in the memory, with respective incremental output values computed for the respective output neurons; and
repeat the updating and the iterating for each next selected few non-zero input neurons of the previous layer to reduce a rate of accessing the memory based on the batch setting to improve a computation time of speech recognition processing.

21. A method for improving computation time of speech recognition processing in an electronic device, the method comprising:
by a processor:
updating a current output value stored in a memory, the current output value corresponding to a selected given output neuron of a current layer of a Deep Neural Network (DNN), the current value being updated with an incremental output value computed for the selected given output neuron as a function of input values of a selected few non-zero input neurons of a previous layer of the DNN in combination with weights between the selected few non-zero input neurons and the selected given output neuron, wherein a number of the selected few corresponds to a batch setting;
compressing a first portion of the weights;
maintaining a second portion of the weights un-compressed, the second portion having weight values exceeding a range of the first portion, the second portion stored separately from the first portion;
iterating the updating for each output neuron of the current layer to update respective current output values, stored in the memory, with respective incremental output values computed for the respective output neurons; and
repeating the updating and the iterating for each next selected few non-zero input neurons of the previous layer to reduce a rate of accessing the memory based on the batch setting to improve the computation time of the speech recognition processing and, in an event all output values of all output neurons of the current layer have been computed based on all non-zero input values of all non-zero input neurons of the previous layer in combination with all compressed weights, performing a subsequent pass to update each output value of each output neuron of the current layer based on input values of input neurons in combination with un-compressed weights.

22. The method of claim 21, wherein the second portion is stored in a sparse matrix.

23. A non-transitory computer-readable medium having encoded thereon a sequence of instructions which, when executed by a processor, causes the processor to:
update a current output value stored in a memory, the current output value corresponding to a selected given output neuron of a current layer of a Deep Neural Network (DNN), the current value being updated with an incremental output value computed for the selected given output neuron as a function of input values of a selected few non-zero input neurons of a previous layer of the DNN in combination with weights between the selected few non-zero input neurons and the selected given output neuron, wherein a number of the selected few corresponds to a batch setting;
compress a first portion of the weights;
maintain a second portion of the weights un-compressed, the second portion having weight values exceeding a range of the first portion, the second portion stored separately from the first portion;
iterate the update operation for each output neuron of the current layer to update respective current output values, stored in the memory, with respective incremental output values computed for the respective output neurons; and
repeat the update and iterate operations for each next selected few non-zero input neurons of the previous layer to reduce a rate of accessing the memory based on the batch setting to improve the computation time of the speech recognition processing and, in an event all output values of all output neurons of the current layer have been computed based on all non-zero input values of all non-zero input neurons of the previous layer in combination with all compressed weights, performing a subsequent pass to update each output value of each output neuron of the current layer based on input values of input neurons in combination with un-compressed weights.

24. The non-transitory computer-readable medium of claim 23, wherein the second portion is stored in a sparse matrix.

* * * * *